(12) United States Patent
Ficner et al.

(10) Patent No.: US 10,439,488 B1
(45) Date of Patent: Oct. 8, 2019

(54) POWER FACTOR CORRECTION SYSTEM WITH VOLTAGE CONVERTER

(71) Applicant: Honeywell International Inc., Morris Plains, NJ (US)

(72) Inventors: Ondrej Ficner, Bucovice (CZ); Petr Senfluk, Brno (CZ); Petr Gross, Morris Plains, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/981,097

(22) Filed: May 16, 2018

(51) Int. Cl.
  *H02M 1/42* (2007.01)
  *H02M 1/12* (2006.01)

(52) U.S. Cl.
  CPC .......... *H02M 1/4208* (2013.01); *H02M 1/126* (2013.01); *H02M 1/4266* (2013.01); *H02M 2001/4291* (2013.01)

(58) Field of Classification Search
  CPC ......... H02M 2001/4291; H02M 1/126; H02M 1/4266
  USPC ....................... 323/303; 363/78–80, 124, 127
  See application file for complete search history.

(56) References Cited

U.S. PATENT DOCUMENTS

| | | | | |
|---|---|---|---|---|
| 5,138,249 A * | 8/1992 | Capel | .................. | H02M 3/1582 323/283 |
| 7,279,872 B2 * | 10/2007 | Hackner | ................. | H02M 1/08 323/266 |
| 8,810,157 B2 * | 8/2014 | Del Carmen, Jr. | ... | H02M 3/158 315/297 |
| 2014/0091724 A1 * | 4/2014 | Palmer | ................ | H02M 3/1582 315/201 |
| 2015/0256101 A1 * | 9/2015 | Yonezawa | ............. | H02M 7/217 363/15 |
| 2017/0093226 A1 * | 3/2017 | Khasnis | .................... | G05F 1/00 |

OTHER PUBLICATIONS

Elayath et al., "High Power Factor Bridgeless Buck Converter Based Isolated Supply for Led," IOSR Journal of Electrical and Electronics Engineering, pp. 50-59, 2016.
Circuit Tradeoffs Minimize Noise in Battery-Input Power Supplies, Maxim Integrated Products, Inc., 9 pages, Nov. 28, 2017.

* cited by examiner

*Primary Examiner* — Gary A Nash
(74) *Attorney, Agent, or Firm* — Seager, Tufte & Wickhem LLP

(57) ABSTRACT

A power transformation system that may incorporate inductive-capacitive circuits configured to receive AC power and filter out output power, a voltage regulator (e.g., microprocessor), a transistor/switch configured to connect or disconnect the input inductive-capacitive circuit to or from, respectively, an output filter, and a level shifter configured to provide a control signal to the transistor to connect or disconnect the inductive-capacitive circuit via the transistor/switch, to or from, respectively, the output filter. The input inductive-capacitive circuit may provide power factor correction for the AC power. The level shifter may provide pulse width modulation control signals to the transistor/switch for connection or disconnection between the inductive-capacitive circuit and the output filter. An input for controlling the level shifter may be provided by an output from a micro controller which is developed by a program that processes information from the output voltage received by the inductive-capacitive circuit output filter.

20 Claims, 4 Drawing Sheets

POWER FACTOR CORRECTION SYSTEM WITH VOLTAGE CONVERTER

BACKGROUND

The present disclosure pertains to power conditioning circuitry.

SUMMARY

The disclosure reveals a power transformation system that may incorporate inductive-capacitive circuits configured to receive AC power and filter out output power, a voltage regulator (e.g., microcontroller or processor), a transistor/switch configured to connect or disconnect the input inductive-capacitive circuit to or from, respectively, an output filter, and a level shifter configured to provide a control signal to the transistor to connect or disconnect the inductive-capacitive circuit via the transistor/switch, to or from, respectively, the output filter. The input inductive-capacitive circuit may provide power factor correction for the AC power. The level shifter may provide pulse width modulation control signals to the transistor/switch for connection or disconnection between the inductive-capacitive circuit and the output filter. An input for controlling the level shifter may be provided by an output from a micro controller which is developed by a program that processes information from the output voltage received by the inductive-capacitive circuit output filter.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

The present system may be of low voltage and low power (i.e., 24 VAC/VDC versus line voltage AC systems). The system does not necessarily have or need isolation of a power source or constant current as may be the case for other systems. In general, one may use rectification and constant voltage non-isolated output in the present case versus other isolated system control.

The system may be used for powering low voltage devices (e.g., actuators) rather than depending on an online voltage power supply with isolated output. Low cost power factor correction (PFC) may be a feature along with optimization for further low costs together with good Power Factor (PF) value.

Power factor correction may provide economic advantages. Field devices may be powered often from a transformer which represents a budget of available VAs (volt-amperes) which a transformer can provide to the system. Large VA consumption may mean just a small number of devices are connected to a transformer. VA may represent power consumption in W (watts) that is divided by a power factor (PF). PF may be low in case of a system design need of half wave rectification (often 0.3-0.4 PF). That may increase the VA need even if the power consumption in W is low.

An illustrative model for costs may be set forth. Each VA may be said to have a value of ~1 USA dollars (USD) due to transformer sizing cost, extra wires, additional transformers and labor. Some power factor correction solutions may be expensive (e.g., ~1 USD may depend on power needs) and do just what the PFC does itself. Also, an adding DC-DC voltage step down converter may cost ~0.8 USD. Another aspect may be electromagnetic compatibility (EMC) protection which might be needed for compliance with agency needs (UL, CE, and so on) where the cost may be 0.1 to 0.5 USD for the device, and so on.

A PFC/step down converter solution may be a cost effective approach to increase PF and also to do voltage regulation in the device together with EMC protection of the device. The cost of the mentioned solution may be ~0.75 USD. That means benefits may need additional costs of up to 2.3 USD in a standard approach of a design (PFC+DC-DC step down converter+EMC protection). In other words, it may mean a savings of ~1.5 USD on each device with the mentioned features.

Decreasing VA consumption may be a market differentiator as well as provide a low cost of the solution. It may increase a value of the product (each saved VA may be ~1 USD saved for customers) along with a low cost of the product itself.

Figure 1:
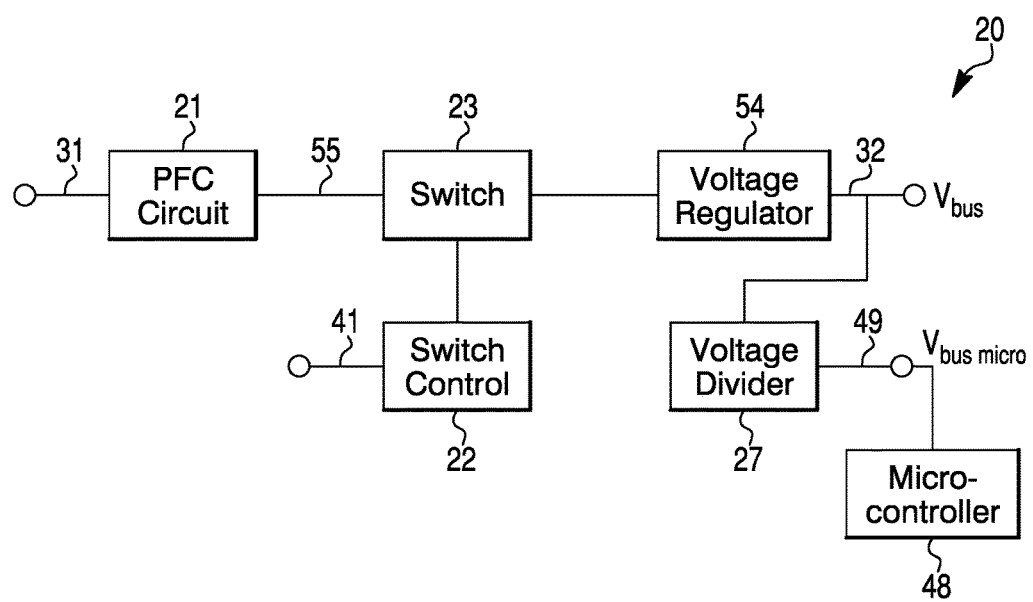
FIG. 1 is a block diagram of the present system.

FIG. 1 is a block diagram of the present circuit system 20. An input may be for presentation of, for example, a rectified AC voltage (not filtered) 61 at terminal 31 connected to PFC input filter 21. An output of PFC input filter 21 may be connected to a switch 23, which may be controlled by a signal from switch control 22. A signal may be present to an input line 41 of switch control 22 for control of switch 23. An output terminal of switch 23 may be connected to an output filter 54. An output 32 of voltage regulator may be connected to a Vbus terminal and to a voltage divider 27. An output 49 from voltage divider 27 may be connected to a Vbus micro terminal. A microcontroller/regulator 48 may be connected with an input to the Vbus micro terminal 49 and with an output to terminal 41 of switch control 22.

Figure 2:
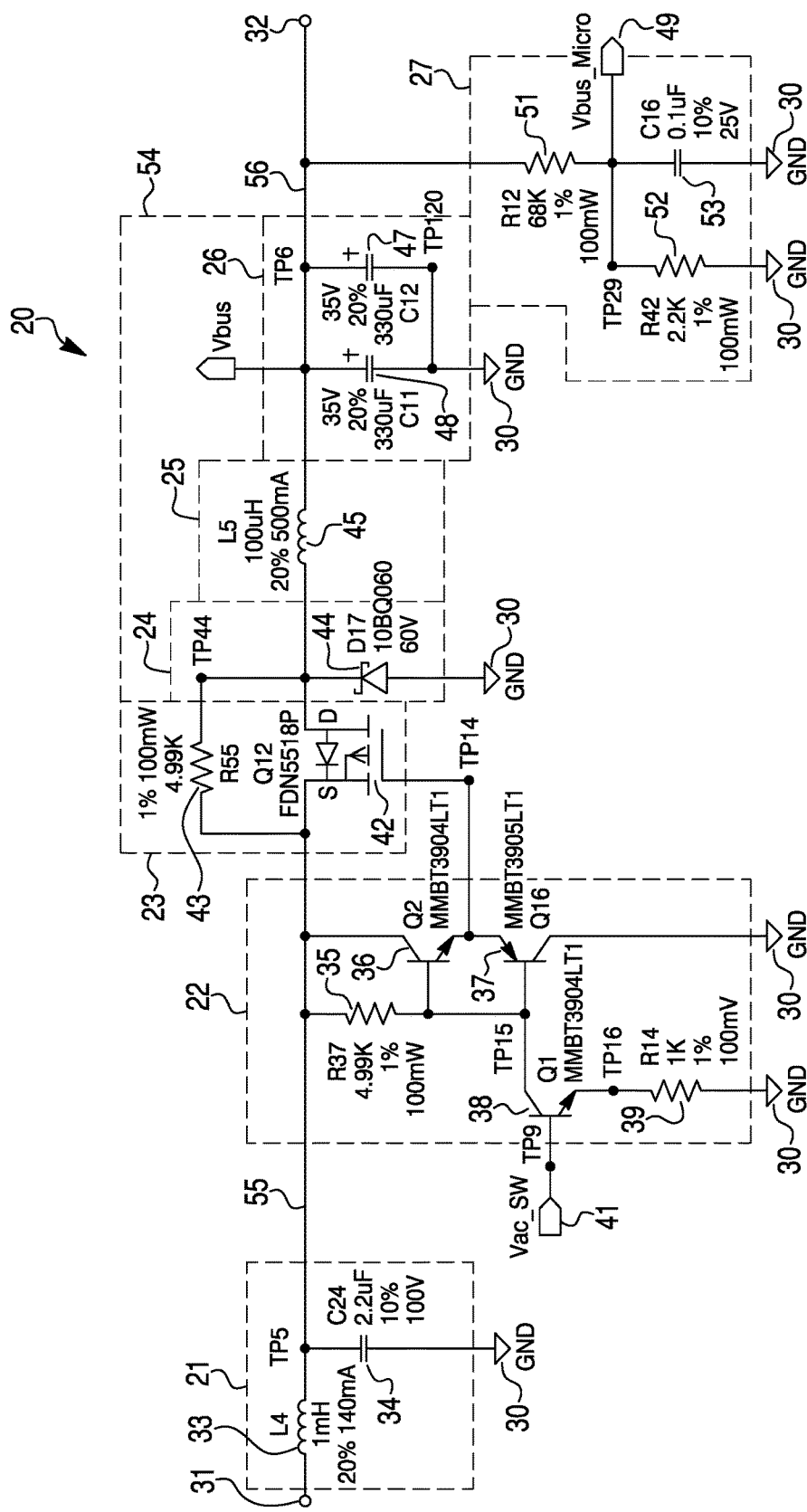
FIG. 2 is a schematic diagram of the present system.

FIG. 2 is a diagram of the present circuit 20. The left side of the diagram is shown with an input side where ~24 VAC voltage may be connected at terminal 31. The right side of the diagram shows an output side with, for example, a stabilized filtered output DC voltage 62 at terminal 32.

The circuit may have two inductors 33 and 45, one pulse width modulation (PWM) switch 23 (e.g., field effect transistor (FET) 42 switch), a diode 44, capacitors 34, 46 and 47, and numerous resistors. Each inductor may have its own role (PFC and voltage regulation) and inductors 33 and 45 may share a common switch 23.

The PFC inductor 33 may be connected to a power input 31 of a device by one side, and to a capacitor 34 and PWM switch 23 on the other side. A voltage regulation inductor 45 may be on the other side of PWM switch 23. Inductor 45 may be connected to PWM switch 23 by one side and to device voltage bus bulk capacitors 46 and 47 on the other side.

PFC input filter 21 may be effective as the input voltage may be higher than an output voltage. Circuit 20 may be driven by the PWM switch. When switch 23 is ON, energy stored in PFC capacitor 34 may be transferred to a voltage regulating inductor 45, current in the inductor or inductors may rise (i.e., inductors accumulate energy), and energy may flow to output bulk capacitors 46 and 47 (limited by the inductors' inductances).

When PWM switch 23 is OFF, energy stored in PFC inductor 33 may tend to flow in the same direction and flow into capacitor 34 where it increases the voltage above the input voltage (i.e., a boost effect) at terminal 31. Energy stored in voltage regulating inductor 45 may flow to output bulk capacitors 46 and 47 through a free-wheeling diode 44.

An output voltage level at terminal 32 may depend on a duty cycle of the PWM to switch 23, input voltage at terminal 31 and current consumption of a device connected to terminal 32. Circuit 20 may need a feedback mechanism to control the duty cycle of the PWM switch 23 to regulate an output voltage at terminal 32. A microcontroller/regulator 48 may be used for it together with voltage divider 27 for reading the output voltage.

Circuit 20 may create an effect of spreading current over the time (i.e., current flowing continuously over the period of time when input voltage is present) as it may block current to flow directly to bulk capacitors 46 and 47 on the output 32 of the circuit (without losses as it stores energy in the inductors 33 and 45, and capacitors 34, 46 and 47). That may improve the PF and reduce VA consumption of a device. Circuit 20 may also convert and regulate the output voltage.

Further details of FIG. 2 may be revealed in the schematic of power factor correction (PFC) circuit 20 with a step-down voltage converter. PFC input filter 21 may incorporate a PFC one micro-henry inductor 33 and a 2.2 microfarad capacitor 34. Inductor 33 may have a one end connected to an input terminal 31 and another end connected to a one end of capacitor 34. The other end of capacitor 34 may be connected to a ground 30. The connection of inductor 33 and capacitor 34 may be connected to one end of a 4.99K ohm resistor 35 and a collector of an NPN junction transistor 36 of a sub-circuit 22 incorporating level shifters for a PWM switch control at sub-circuit 23. The other end of resistor 35 may be connected to a base of transistor 35, a base of a PNP junction transistor 37 and a collector of an NPN transistor 38 of sub-circuit 23. An emitter of transistor 36 may be connected to an emitter of transistor 37. A collector of transistor 37 may be connected to a ground 30. An emitter of transistor 38 may be connected to one end of a 1K ohm resistor 39. A base of transistor 38 may be connected to an AC voltage source at a terminal 41.

A PWM switch of sub-circuit 23 may incorporate a P-channel FET 42. The collector of transistor 36 may be connected to a source of FET 42. The emitters of transistors 36 and 37 may be connected to a gate of FET 42. A drain of FET 42 may be connected to a cathode of a rectification diode (e.g., Schottky type) 44 of a sub-circuit 24. A 4.99K ohm resistor 43 may be connected across the source and drain of FET 42. An anode of diode 44 may be connected to ground 30.

The anode of diode 44 may be connected to one end of a 100 micro henry inductor 45 that constitutes a sub-circuit 25. The other end of inductor 45 may be connected to a sub-circuit 26 of bulk capacitors. The other end of inductor 45 may be connected specifically, for example, to one end of a 330 microfarad capacitor 46, one end of a 330 microfarad capacitor 47, a Vbus terminal and output terminal 32. Sub-circuits 24, 25 and 26 may form output filter 54.

A sub-circuit 27 may have voltage feedback dividers. For instance, a 68K ohm resistor 51 may have one end connected to Vbus terminal 32 and the other end connected to a Vbus micro terminal 49, one end of a 2.2K ohm resistor 52, and one end of a 0.1 microfarad capacitor 53. The other end of resistor 52 and the other end of capacitor 53 may be connected to ground 30.

Figure 3:
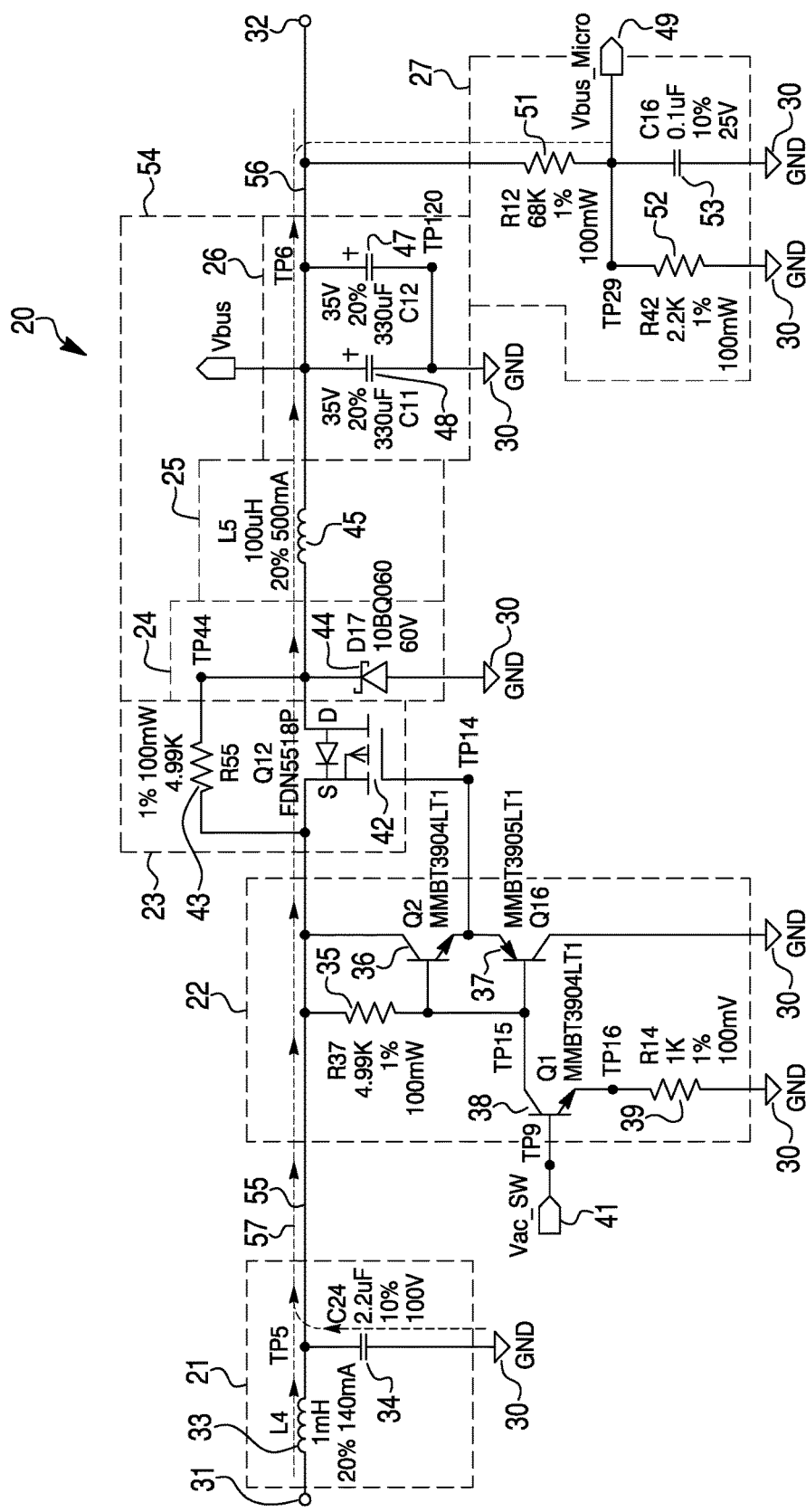
FIG. 3 is a diagram of a first state of current flow through the present system.
Figure 4:
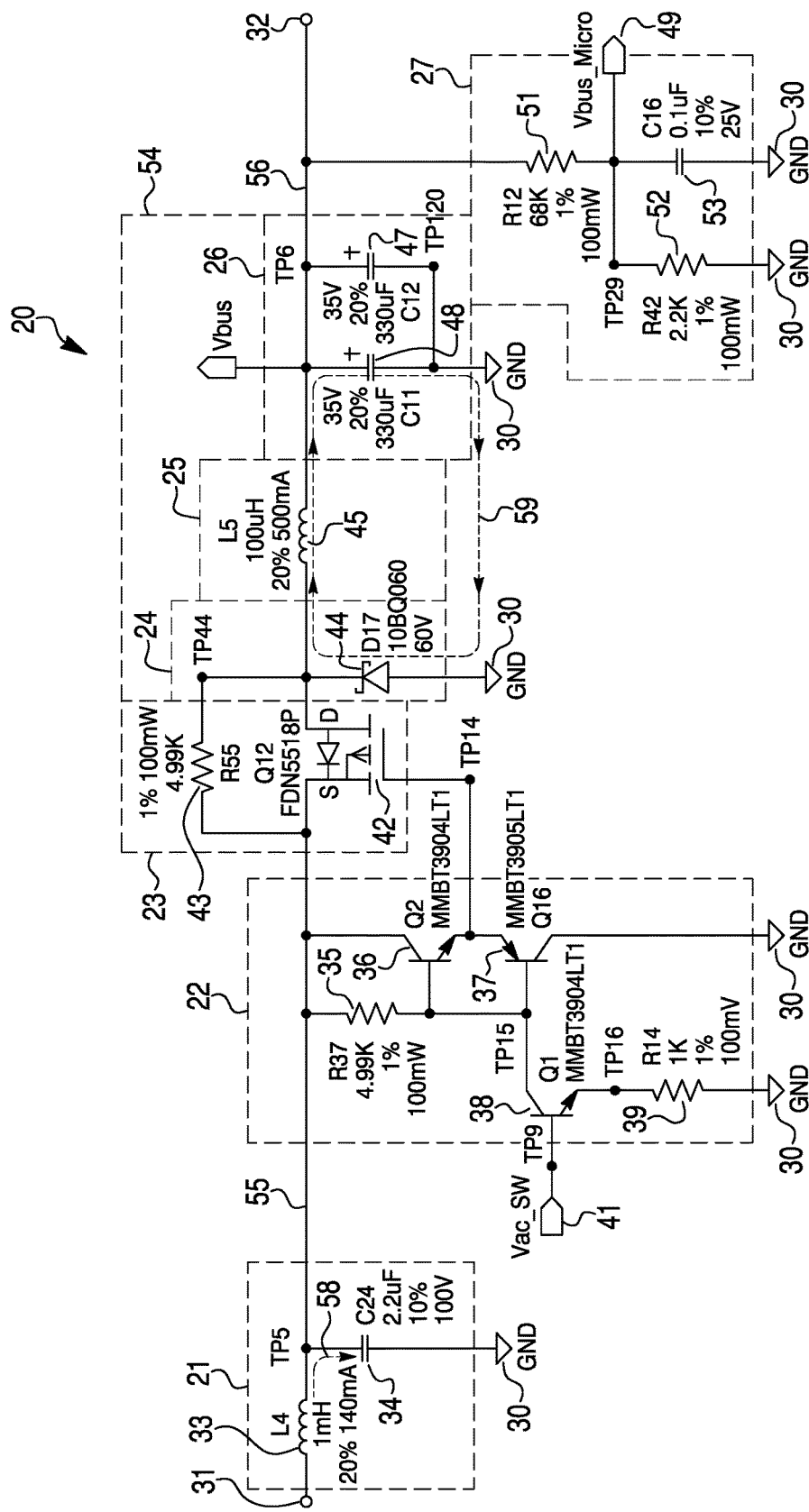
FIG. 4 is a diagram of a second state of current flow through the present system.

In general, two states may be noted. The first state is illustrated in FIG. 3 showing the flow of current 57 through circuit 20. The second state is illustrated in FIG. 4 showing the flow of current 58 through inductor 33 and capacitor 34 to ground 30. Also shown in FIG. 3 is the flow of current 59 from ground 30 through diode 44, inductor 45, capacitors 46 and 47, and ground 30.

The states of circuit 20 may be noted in a little closer. One may be when PWM switch FET 42 of sub-circuit 23 is ON, as shown in FIG. 3. A current 57 may flow from terminal 31 through inductor 33, plus current from capacitor 34 may flow along line 55, through FET 42, inductor 45 and along line 56 to terminal 32.

The other state may be when PWM switch FET 42 is OFF, as shown in FIG. 4. A current 58 may flow from terminal 31 through inductor 33 and capacitor 34 to ground 30. Negligible current may flow through resistor 43. However, there may be a circuit flow of current 59 in a loop from ground 30 through diode 44 in a free-wheeling manner through inductor 45 and capacitors 46 and 47, and back through ground 30.

To recap, an approach for power conditioning may incorporate inductively or capacitively conditioning an AC power to increase a power factor of the AC power with an inductor-capacitive LC circuit, forwarding a current of the AC power to a switch, and feeding the switch a control signal that either turns the switch on or turns the switch off. When the switch is turned on, the current may flow over a diode which holds down a voltage associated with the current, and charges up a capacitor bank as needed and results in a voltage at an output from the capacitor bank. When the switch is turned off, the current may have an absence of flow through the switch but instead may flow through an inductor into a capacitor of the LC circuit at the input, and the other remaining current past the switch may flow through an inductor, the capacitor bank and through the diode, in free-wheeling fashion in a closed path.

A control signal may turn the switch on and off in a continuous manner. The control signal may be generated by a micro controller having a first input connected to the input of the LC circuit, a second input connected to the capacitor bank, and an output that provides the control signal to the switch.

The control signal may turn on the switch at a positive potential duration of the AC power at the input of the LC circuit and turn the switch off at a negative potential duration of the AC power at the input of the LC circuit.

The control signal may be a pulse width modulation signal that results in a rectified signal passing from the switch to the inductor.

The control signal may be a pulse width modulation signal that is adjusted to result in a step-up or step-down voltage at the capacitor bank. The micro controller may be programmed to adjust the control signal for the step-up or step-down voltage.

A power conditioning system may incorporate a power factor circuit having an input for connection to an AC voltage supply, a switch connected to the power factor circuit, a switch control having an output connected to the switch, a voltage regulator connected to the switch, and a voltage divider connected to the voltage regulator.

The power factor may incorporate an inductor having a first end connected to the input of the power factor circuit, and a capacitor having one end connected to a second end of the inductor and having a second end connected to a ground.

The inductor and capacitor may have inductance and capacitance values that correct a power factor of an AC voltage applied to the input of the power factor circuit.

The switch may have a first terminal connected to the second end of the inductor, and have a second terminal and a third terminal.

The switch may be a transistor.

The transistor may be a FET. The first terminal of the switch may be connected to a source of the FET, the second terminal of the switch may be connected to a drain of the FET, and the third terminal of the switch may be connected to a base of the FET.

The switch control may have the output connected to the third terminal of the switch, have a first terminal connected to the second end of the inductor, have a second terminal connected to the ground, and have an input.

The switch control may receive at the input a signal and may incorporate a level shifter that from the signal provides a pulse width modulation signal to the third terminal of the switch.

The voltage regulator may incorporate a diode having a cathode connected to the second terminal of the switch and an anode connected to the ground, a second inductor having a first end connected to the cathode of the diode and having a second end, and a capacitive storage module having a first terminal connected to the second end of the second inductor and having a second terminal connected to the ground.

The diode may be a rectification diode.

The voltage divider may have an input that is connected to the first terminal of the capacitive storage module and have an output.

The system may further incorporate a micro-controller having a first input connected to the output of the voltage divider, a second input connected to the input of the power factor circuit, and an output connected to the input of the switch control.

A power transformation mechanism may incorporate an inductive-capacitive circuit configured to receive AC power, a voltage regulator, a transistor configured to connect or disconnect the inductive-capacitive circuit to or from, respectively, the voltage regulator, and a level shifter configured to provide a control signal to the transistor to connect or disconnect the inductive-capacitive circuit via the transistor, to or from, respectively, the voltage regulator.

The inductive-capacitive circuit may provide power factor correction for the AC power. The level shifter may provide pulse width modulation control signals to the transistor for connection or disconnection between the inductive-capacitive circuit and the voltage regulator. An input for controlling the level shifter may be provided by an output from a micro-controller which is developed by a program that processes information from the AC power received by the inductive-capacitive circuit and from an output of the voltage regulator.

The pulse width modulation signal to the transistor may cause a connection by the transistor at a positive potential duration of the AC power, and cause a disconnection at a negative potential duration of the AC power. The connection and disconnection of the transistor may result in a rectified signal to the voltage regulator. The connection and disconnection of the transistor may result in a step-up or a step-down voltage at the voltage regulator.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A method for power conditioning comprising:
   inductively or capacitively conditioning an AC power to increase a power factor of the AC power with an inductor-capacitive LC circuit;
   forwarding a current of the AC power to a switch; and
   feeding the switch a control signal that either turns the switch on or turns the switch off; and
   wherein:
   when the switch is turned on, the current flows over a diode which holds down a voltage associated with the current, and charges up a capacitor bank as needed and results in a voltage at an output from the capacitor bank; and
   when the switch is turned off, the current has an absence of flow through the switch but instead flows through an inductor into a capacitor of the LC circuit at the input, and the other remaining current past the switch flows through an inductor, the capacitor bank and through the diode, in free-wheeling fashion in a closed path.

2. The method of claim 1, wherein:
   a control signal turns the switch on and off in a continuous manner; and
   the control signal is generated by a micro controller having a first input connected to the input of the LC circuit, a second input connected to the capacitor bank, and an output that provides the control signal to the switch.

3. The method of claim 2 wherein the control signal is a pulse width modulation signal that results in a rectified signal passing from the switch to the inductor.

4. The method of claim 2, wherein:
   the control signal is a pulse width modulation signal that is adjusted to result in a step-up or step-down voltage at the capacitor bank; and
   the micro controller is programmed to adjust the control signal for the step-up or step-down voltage.

5. The method of claim 1, wherein the control signal turns on the switch at a positive potential duration of the AC power at the input of the LC circuit and turns the switch off at a negative potential duration of the AC power at the input of the LC circuit.

6. A power conditioning system comprising:
   a power factor circuit having an input for connection to an AC voltage supply, the power factor circuit comprising an inductor having a first end connected to the input of the power factor circuit;
   a switch connected to the power factor circuit;
   a switch control having an output connected to the switch;
   a voltage regulator connected to the switch; and
   a voltage divider connected to the voltage regulator; and wherein the switch control has a first terminal connected to a second end of the inductor and has a second terminal connected to a ground, and has an input.

7. The system of claim 6, wherein the power factor circuit comprises
a capacitor having one end connected to a second end of the inductor and having a second end connected to the ground.

8. The system of claim 7, wherein the inductor and capacitor have inductance and capacitance values that correct a power factor of an AC voltage applied to the input of the power factor circuit.

9. The system of claim 7, wherein the switch has a first terminal connected to the second end of the inductor, and has a second terminal and a third terminal.

10. The system of claim 9, wherein the switch is a transistor.

11. The system of claim 10, wherein:
the transistor is a FET; and
the first terminal of the switch is connected to a source of the FET, the second terminal of the switch is connected to a drain of the FET, and the third terminal of the switch is connected to a base of the FET.

12. The system of claim 9, wherein the switch control has the output connected to the third terminal of the switch.

13. The system of claim 12, wherein the switch control receives at the input a signal and comprises a level shifter that from the signal provides a pulse width modulation signal to the third terminal of the switch.

14. The system of claim 12, wherein the voltage regulator comprises:
a diode having a cathode connected to the second terminal of the switch and an anode connected to the ground;
a second inductor having a first end connected to the cathode of the diode and having a second end; and
a capacitive storage module having a first terminal connected to the second end of the second inductor and having a second terminal connected to the ground.

15. The system of claim 14, wherein the diode is a rectification diode.

16. The system of claim 14, wherein the voltage divider has an input that is connected to the first terminal of the capacitive storage module and has an output.

17. The system of claim 16, further comprising a controller having a first input connected to the output of the voltage divider, a second input connected to the input of the power factor circuit, and an output connected to the input of the switch control.

18. A power transformation mechanism comprising;
an inductive-capacitive circuit configured to receive AC power;
a voltage regulator;
a transistor configured to connect or disconnect the inductive-capacitive circuit to or from, respectively, the voltage regulator; and
a level shifter configured to provide a control signal to the transistor to connect or disconnect the inductive-capacitive circuit via the transistor, to or from, respectively, the voltage regulator; and
wherein an input for controlling the level shifter is provided by an output from a micro controller which is developed by a program that processes information from the AC power received by the inductive-capacitive circuit and from an output of the voltage regulator.

19. The mechanism of claim 18, wherein:
the inductive-capacitive circuit provides power factor correction for the AC power; and
the level shifter provides pulse width modulation control signals to the transistor for connection or disconnection between the inductive-capacitive circuit and the voltage regulator.

20. The mechanism of claim 19, wherein:
the pulse width modulation signal to the transistor causes a connection by the transistor at a positive potential duration of the AC power, and causes a disconnection at a negative potential duration of the AC power;
the connection and disconnection of the transistor result in a rectified signal to the voltage regulator; and
the connection and disconnection of the transistor result in a step-up or a step-down voltage at the voltage regulator.

* * * * *